No. 769,078.

Patented August 30, 1904.

UNITED STATES PATENT OFFICE.

LUDWIG HATSCHEK, OF VÖCKLABRUCK, AUSTRIA-HUNGARY.

PROCESS OF MANUFACTURING IMITATION STONE PLATES, SLABS, OR TILES.

SPECIFICATION forming part of Letters Patent No. 769,078, dated August 30, 1904.

Application filed May 11, 1900. Serial No. 16,362. (No specimens.) REISSUED

*To all whom it may concern:*

Be it known that I, LUDWIG HATSCHEK, a subject of the Emperor of Austria-Hungary, residing at Vöcklabruck, in the Empire of Austria-Hungary, have invented certain new and useful Improvements in Processes of Manufacturing Imitation Stone Plates, Slabs, or Tiles, of which the following is a specification.

This invention relates to the production of artificial stone plates from hydraulic cements—*e. g.*, Portland cement, Roman cement, hydraulic lime, or like cements which set with and under water. These stone plates have a great resisting power against atmospheric influences, and especially against water and change of temperature and also against frost and mechanical blows.

The invention is carried into effect by mixing intimately fibrous material—such as asbestos, for example—in the presence of a great bulk of water with hydraulic cement and by working up this watery mixture to plates of the desired thickness in the manner of the process of making cardboard. The cardboard-like plates obtained are then pressed under high pressure, whereby they may, if desired, be caused to receive any predetermined shape or appearance. After some time the product obtained becomes as hard as stone by the setting of the cement. The mixing of the materials to be employed and the working up of the mixture are preferably carried out in the usual machines for making cardboard or paper, whereby the quantity of the water may be even larger than in making paper or cardboard.

The process is based, as I have found, on the facts that in working a hydraulic cement with a large bulk of water and with the addition of fibrous material—*e. g.*, asbestos—the setting or hardening power of the cement is not destroyed, and the hydraulic cement added slowly to the well-divided asbestos is intimately associated with the latter, so that no separation takes place, even if the weight of the cement amounts to four to nine times the weight of the asbestos. The water is and remains clear even after a long time. The hydraulic cement of the mixture seems to swell up, taking the appearance of a more or less colloidal, starch, or paste-like mass. These facts explain, perhaps, that such a mixture can undergo the working on the cardboard-machine without setting or hardening and without separation of the cement during this process and that in consequence of the layer-like structure of the plates obtained they can be subjected to a very high pressure without causing any particles of the mass to be pressed out laterally. Only clear water escapes, and the plates retain their original dimensions apart from the thickness reduced by the pressure.

The plates produced need no impregnating or additional means for hardening and no covering or the like for their durability. After a sufficiently long time of hardening such plates are so hard and at the same time so tough and strong that those of a thickness of about four millimeters, for example, do not crack even if they fall a distance of three meters and more to the ground. The plates of my invention have the advantage of being frost-proof and of absorbing only very small proportions of water, so that in using them as roofing material, for instance, their weight does not materially increase during moist weather. They are practically waterproof. They show also very important differences and advantages in comparison with slate plates and the plates made from magnesia, oxid of zinc, or Sorel cement or other artificial stones from hydraulic cement and asbestos produced in the ordinary way.

In carrying out the process I disintegrate the desired quantity of fibrous material—*e. g.*, asbestos—in the presence of water in such a way that the single fibers of the material are separated from each other. Then the hydraulic binding medium—*e. g.*, hyhaulic cement—is added and well intermingled and worked with large quantities of water, whereupon the mixture is immediately worked up in the usual way of making cardboard by means of cardboard-machines. In such a way it is possible to produce an article which contains forty to ninety per cent. of cement with twenty to ten per cent. of fibrous material.

The carrying out of the process may be explained in a more detailed manner by the following example with the use of a well-known cardboard-machine: Into a mixing and disintegrating machine of about three to five cubic meters capacity fifty kilograms of asbestos are introduced. The asbestos, which is preferably previously disintegrated in an edge-mill, is subjected to the treatment in the said mixing-machine until it is sufficiently broken up—that is, until the fibers are as much as possible separated. Then the required proportion of the hydraulic cement—e. g., about two hundred and fifty kilograms—is gradually added, the entire bulk being mixed thoroughly. The thus prepared mixture is then caused to flow immediately into a vessel with a stirring device, the capacity of which veesel is preferably five to six times greater than that of the mixing-machine. The mixture is diluted with five to six times the quantity of water, the mixture being continuously agitated or stirred. From this vessel the thin paste is immediately conveyed to the cardboard-making machine in order to obtain a cardboard-like product. In the cardboard-making machine the thin paste containing the asbestos and hydraulic cement is thus conveyed to or upon an endless rotating porous fabric, through which the water of the thin paste or pulp flows off, leaving on the upper side the hydraulic cement intermixed with asbestos as a thin layer, which layer is conducted to a rotating roller, on which this layer is taken off from the said endless fabric and rolled up thereon. Thus a sheet is formed composed of several superposed layers, the number of which layers corresponds to the number of rotations of said roller. As soon as the thus-obtained product on the roller has reached the desired thickness the same is cut to the desired size and pressed to the desired shape, whereupon it is caused to set in suitable rooms.

I claim as my invention—

1. The herein-described process of producing artificial stone plates, consisting of first mixing fibrous material and hydraulic cement in the presence of a great bulk of water, then forming therefrom a series of thin layers of the mixed cement and fibrous material superposed on each other until the required thickness is secured, then pressing the same and allowing the material to set or harden.

2. The herein-described process of producing artificial stone plates, consisting of first mixing asbestos fibers and hydraulic cement in the presence of a great bulk of water, then forming therefrom a series of thin layers of the mixed cement and asbestos superposed on each other until the required thickness is secured, then pressing the same and allowing the material to set or harden, substantially as set forth.

In testimony whereof I have hereunto set my hand in the presence of two witnesses.

LUDWIG HATSCHEK.

Witnesses:
  MAX EHRENZWEIG,
  ALVESTO S. HOGUE.